United States Patent
Uetsuka

(10) Patent No.: US 11,099,446 B2
(45) Date of Patent: Aug. 24, 2021

(54) HIGH-SPEED OPTICAL SWITCHING ENGINE

(71) Applicant: NATIONAL INSTITUTE OF ADVANCED INDUSTRIAL SCIENCE AND TECHNOLOGY, Tokyo (JP)

(72) Inventor: Hisato Uetsuka, Ibaraki (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 0 days.

(21) Appl. No.: 16/627,198

(22) PCT Filed: Jun. 27, 2018

(86) PCT No.: PCT/JP2018/024410
§ 371 (c)(1),
(2) Date: Dec. 27, 2019

(87) PCT Pub. No.: WO2019/004295
PCT Pub. Date: Jan. 3, 2019

(65) Prior Publication Data
US 2020/0225514 A1    Jul. 16, 2020

(30) Foreign Application Priority Data
Jun. 27, 2017 (JP) .............................. JP2017-125533

(51) Int. Cl.
*G02F 1/137* (2006.01)
*G02F 1/1335* (2006.01)
*G02F 1/1333* (2006.01)

(52) U.S. Cl.
CPC ........ *G02F 1/137* (2013.01); *G02F 1/133553* (2013.01); *G02F 1/13775* (2021.01); *G02F 1/13793* (2021.01); *G02F 1/133302* (2021.01)

(58) Field of Classification Search
CPC . C09K 19/0275; G02F 1/31; G02F 1/133302; G02F 1/133553; G02F 1/13775;
(Continued)

(56) References Cited

U.S. PATENT DOCUMENTS

| 2012/0188467 A1 | 7/2012 | Escuti et al. |
| 2016/0018679 A1* | 1/2016 | Shiyanovskii ........... G02B 6/02 349/33 |

FOREIGN PATENT DOCUMENTS

| JP | 1994-018940 A | 1/1994 |
| JP | 2012-242574 A | 12/2012 |

(Continued)

OTHER PUBLICATIONS

International Search Report (PCT/JP2018/024410).
(Continued)

*Primary Examiner* — Jessica M Merlin
(74) *Attorney, Agent, or Firm* — Taro Yaguchi

(57) ABSTRACT

When polymer-stabilized blue-phase liquid crystal is driven by comb-shaped electrodes, a large electric field is generated near the electrodes, and electrostriction results in degradations in the switching speed of polymer-stabilized blue-phase liquid crystal. This optical switching engine is manufactured by inserting polymer-stabilized blue-phase liquid crystal between parallel plates on which are formed conventional thin film electrodes, followed by bonding a polarization grating plate thereto, and disposing or bonding two silicon wedges having triangular cross sections to the sides thereof so as to have rotational symmetry with each other.

14 Claims, 10 Drawing Sheets

(58) Field of Classification Search
CPC ... G02F 1/137; G02F 2001/56; G02F 1/13793
See application file for complete search history.

(56) References Cited

FOREIGN PATENT DOCUMENTS

| | | |
|---|---|---|
| JP | 2014-186045 A | 10/2014 |
| JP | 2014-211457 A | 11/2014 |
| WO | 2018-173813 A1 | 9/2018 |

OTHER PUBLICATIONS

The extended European search report issued by the European Patent Office dated Apr. 26, 2021 for patent application No. 18823477.7.
Zichen Zhang et al., "Fundamentals of phase-only liquid crystal on silicon (LCOS) devices" Oct. 24, 2014, 3, e213; doi:10.1038/lsa.2014.94 p. 1-10, Light: Science & Applications (2014).
Jihwan Kim et al., "Wide-angle, nonmechanical beam steering using thin liquid crystal polarization gratings", Aug. 14, 2008, vol. 7093, p. 709302-1-709302-12, XP002606928, Proceedings of SPIE. IEEE. US.
Rahman M D Asiqur et al., "Blue phase liquid crystal: strategies for phase stabilization and device development", vol. 16. No. 3. Jun. 20, 2015. p. 033501. XP055790344, Science and Technology of Advanced Materials.

\* cited by examiner

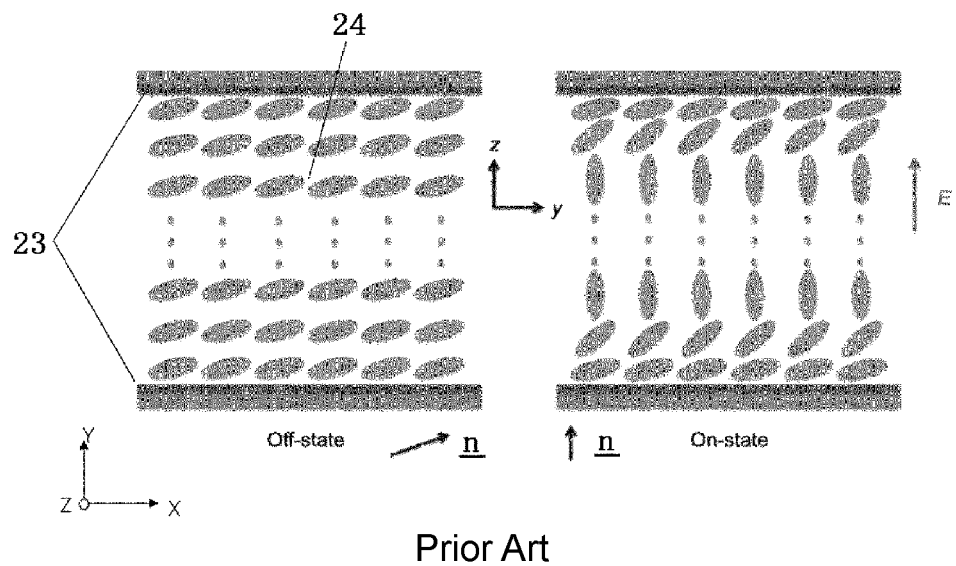
Prior Art
FIG. 1
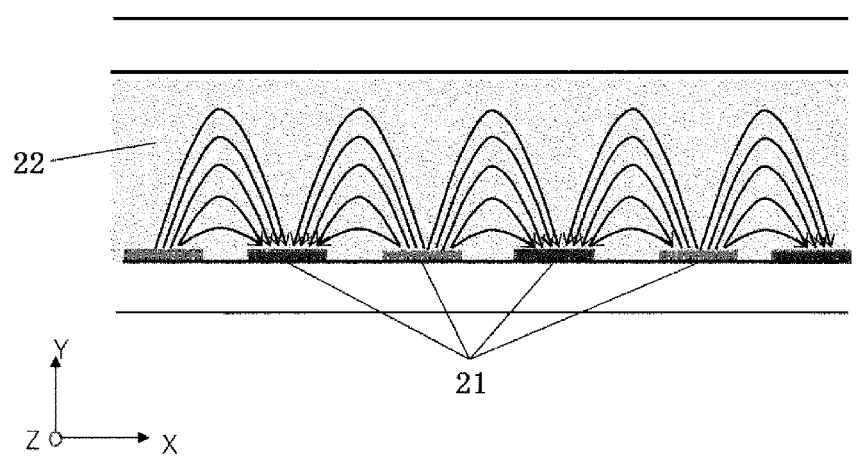
Prior Art
FIG. 2

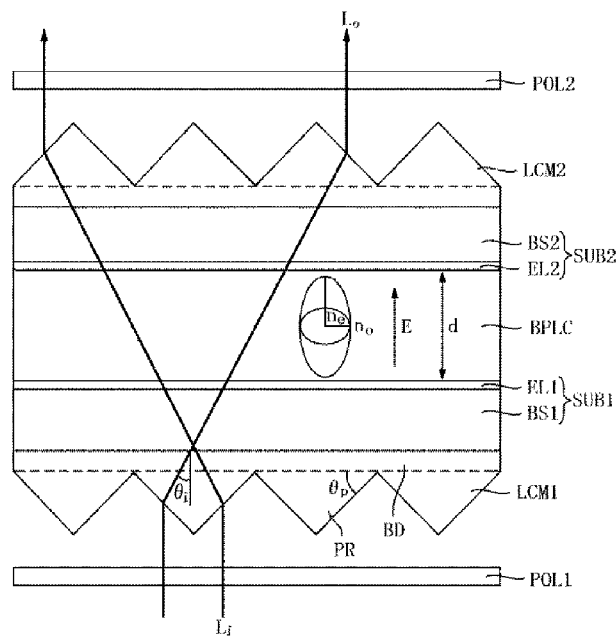
Prior Art
FIG. 3
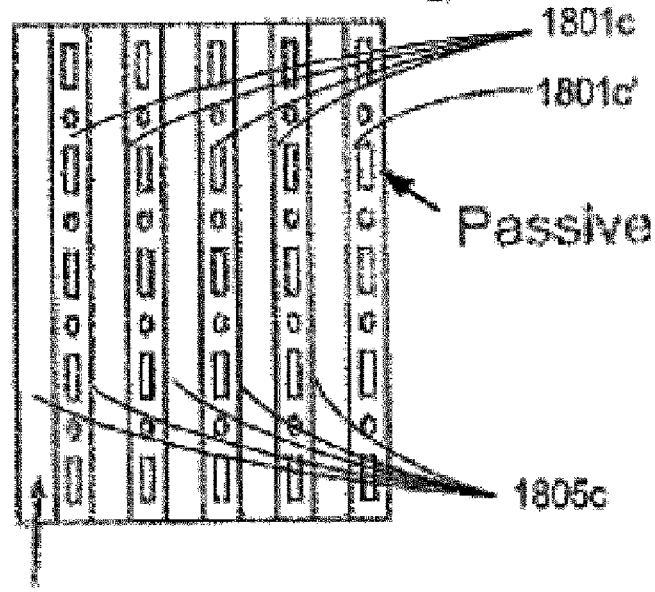
Prior Art
FIG. 4

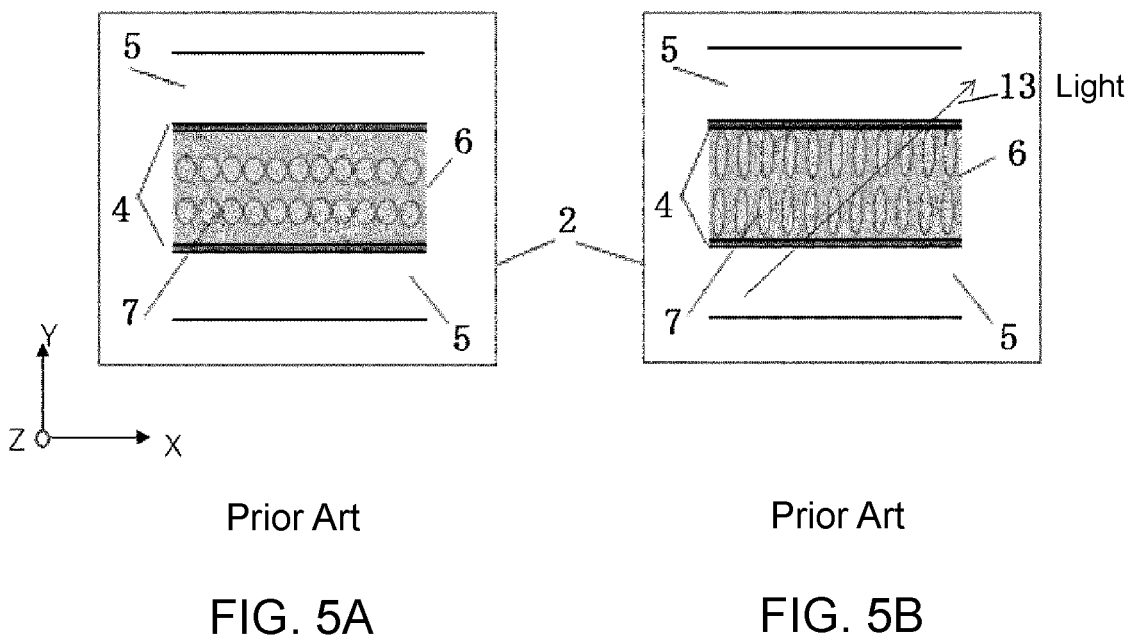
Prior Art
FIG. 5A
Prior Art
FIG. 5B

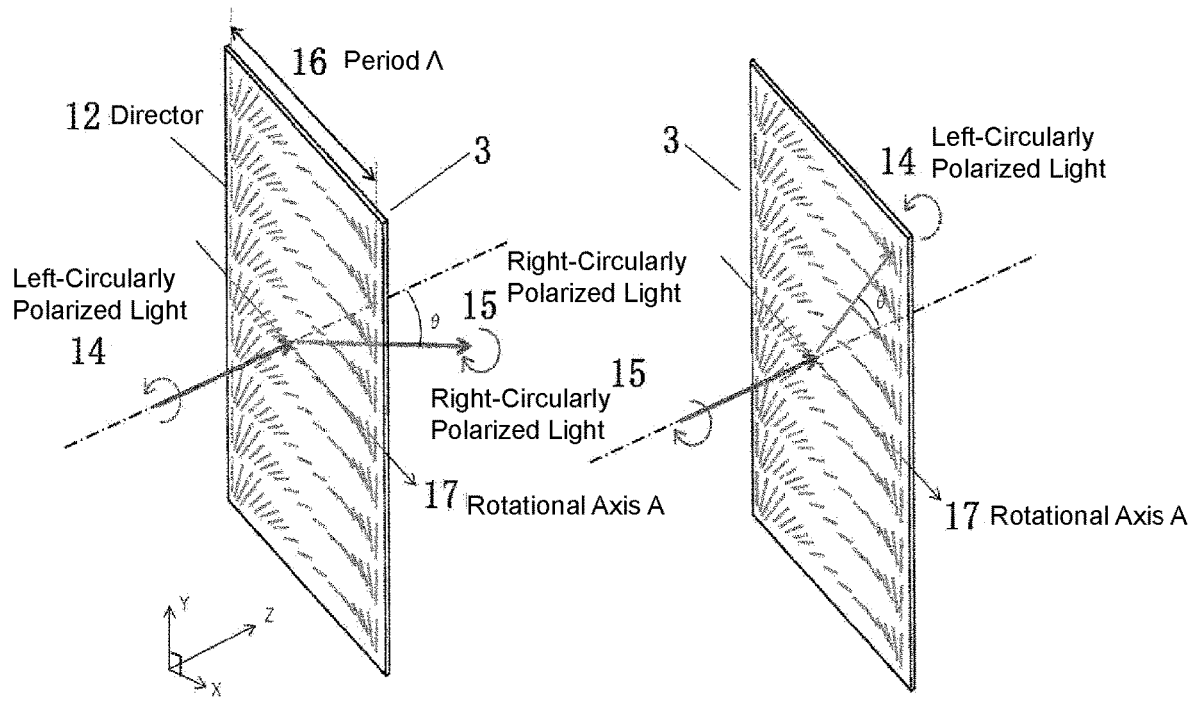
FIG. 6A    FIG. 6B
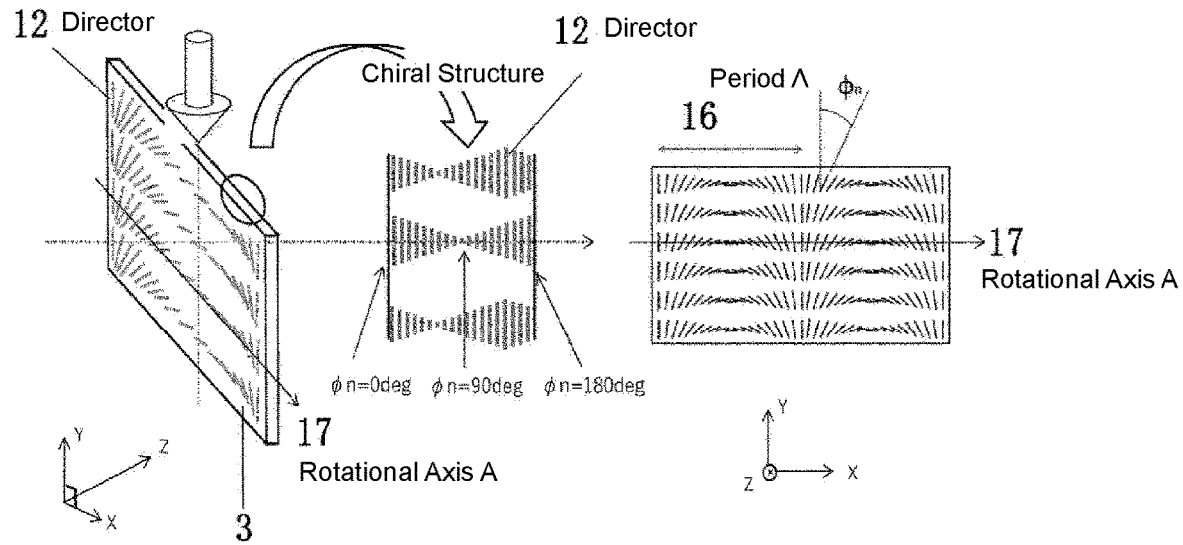
FIG. 6C

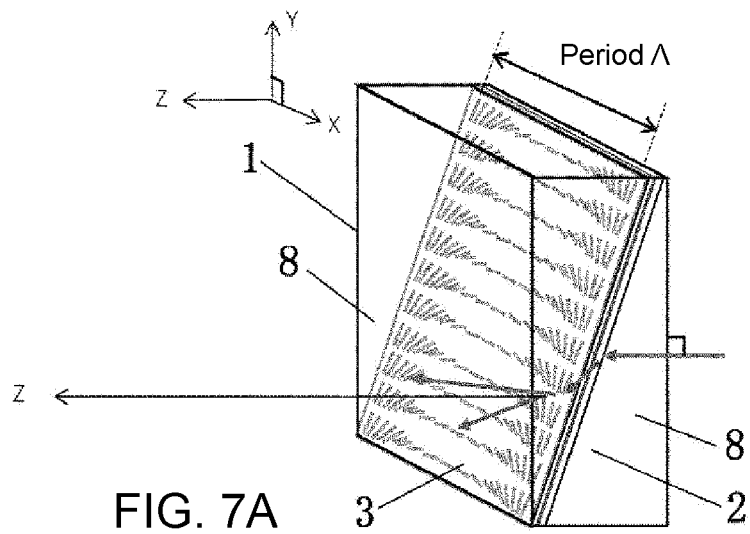
FIG. 7A
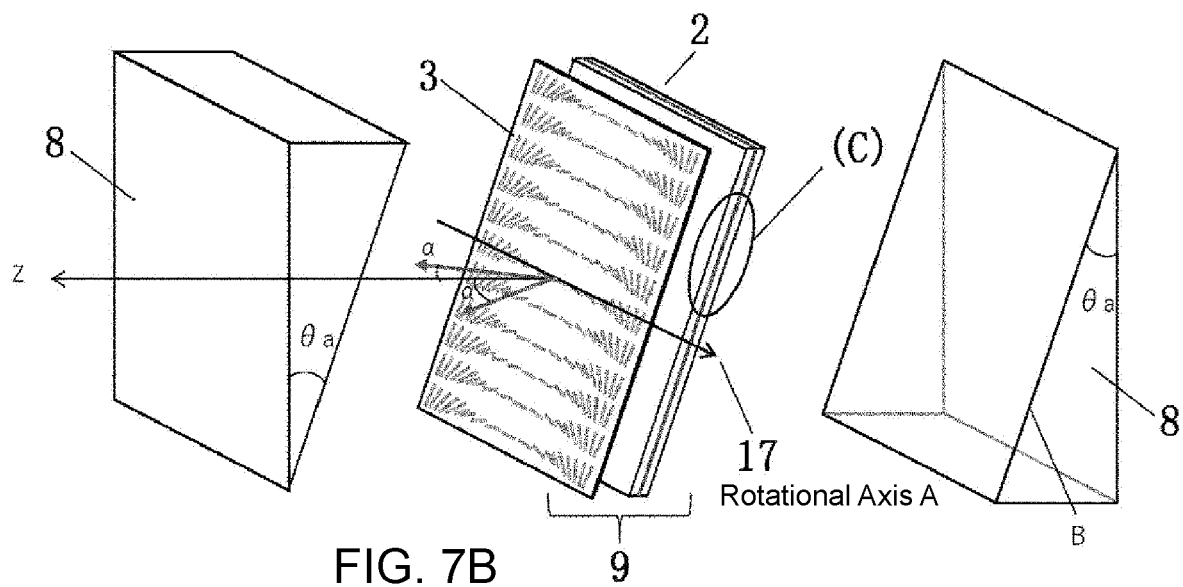
FIG. 7B
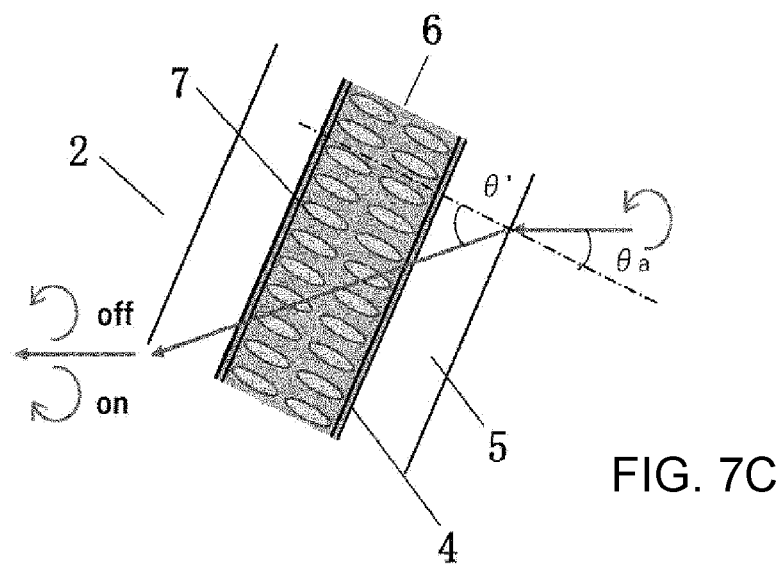
FIG. 7C

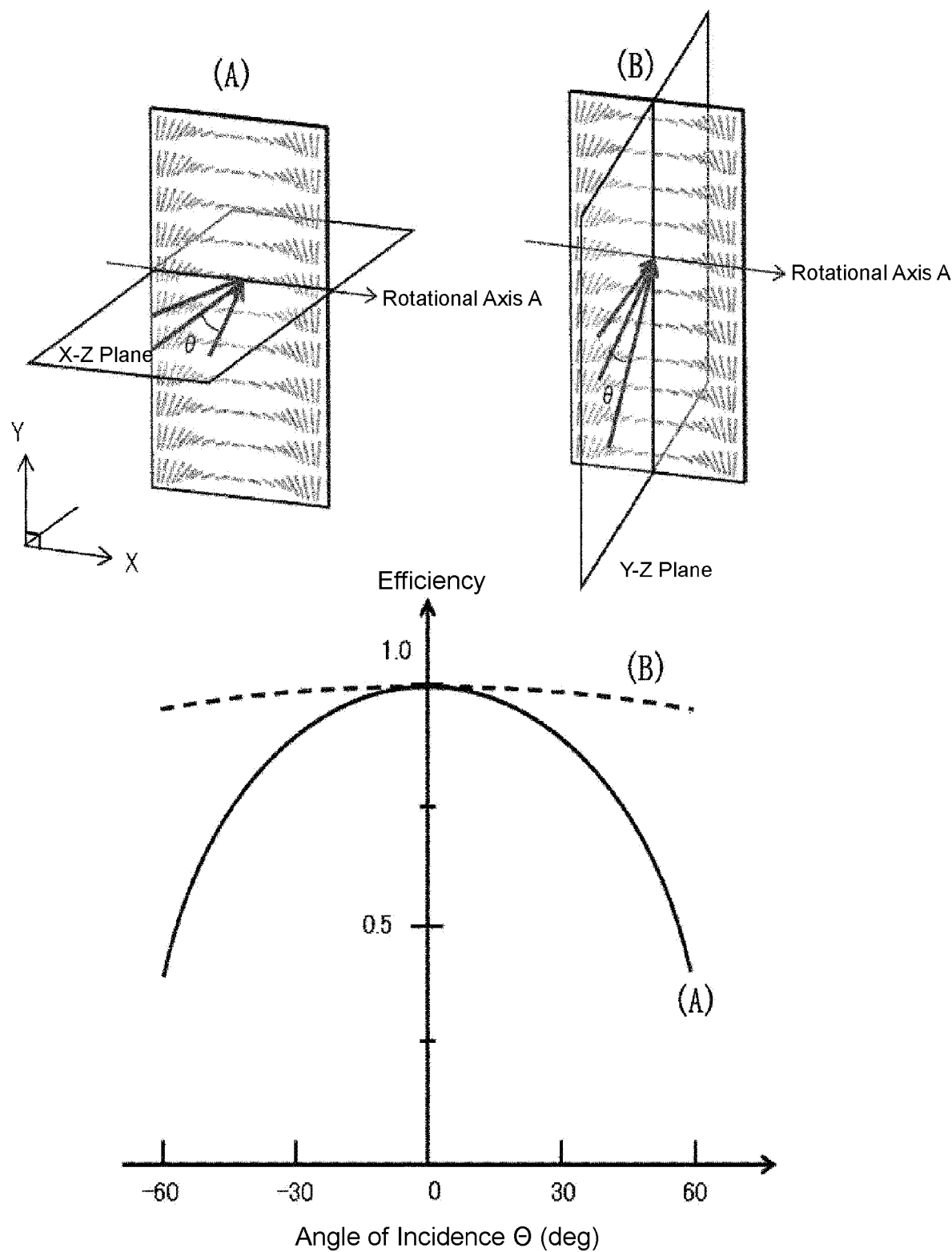
FIG. 8

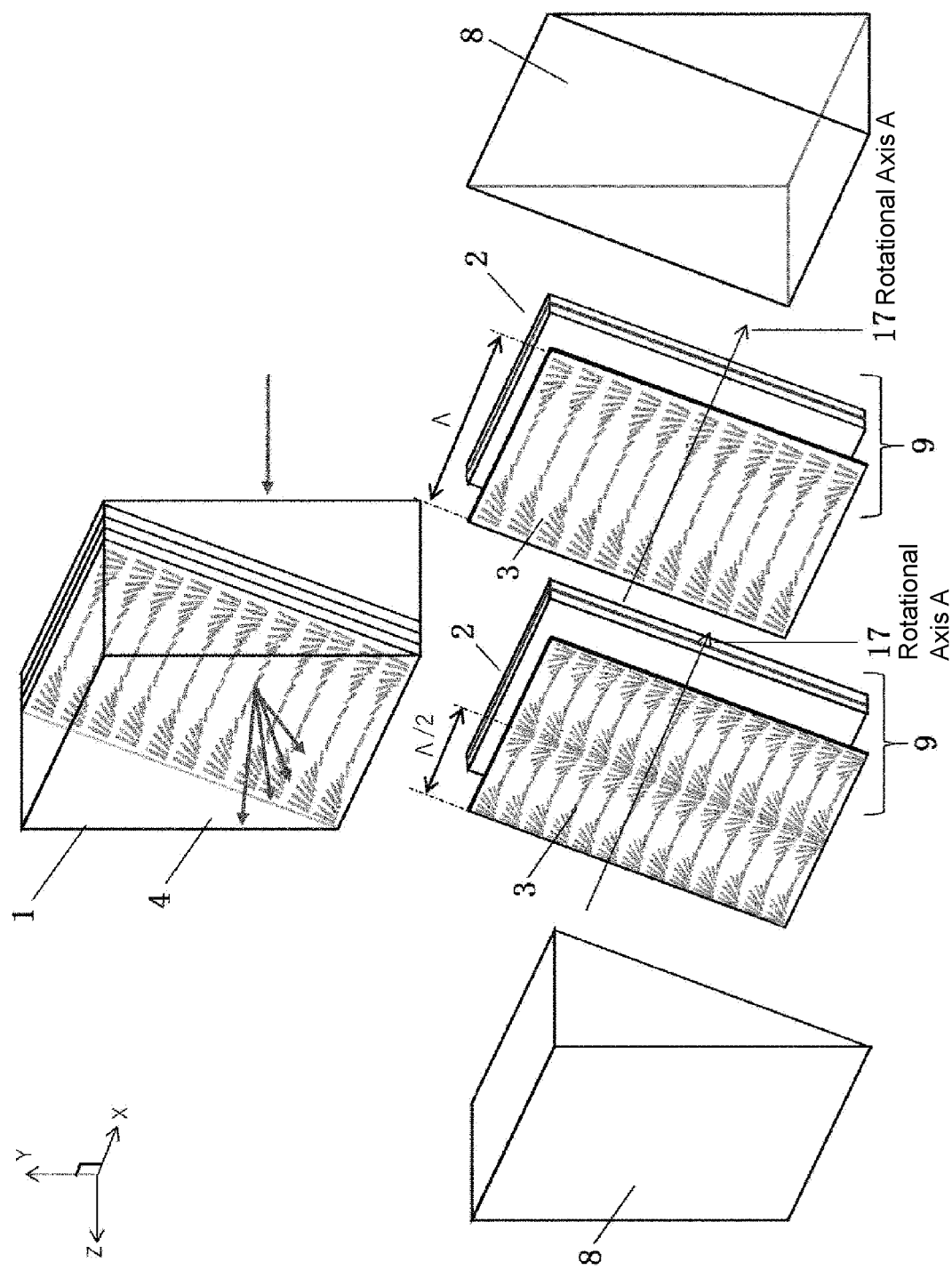
FIG. 9

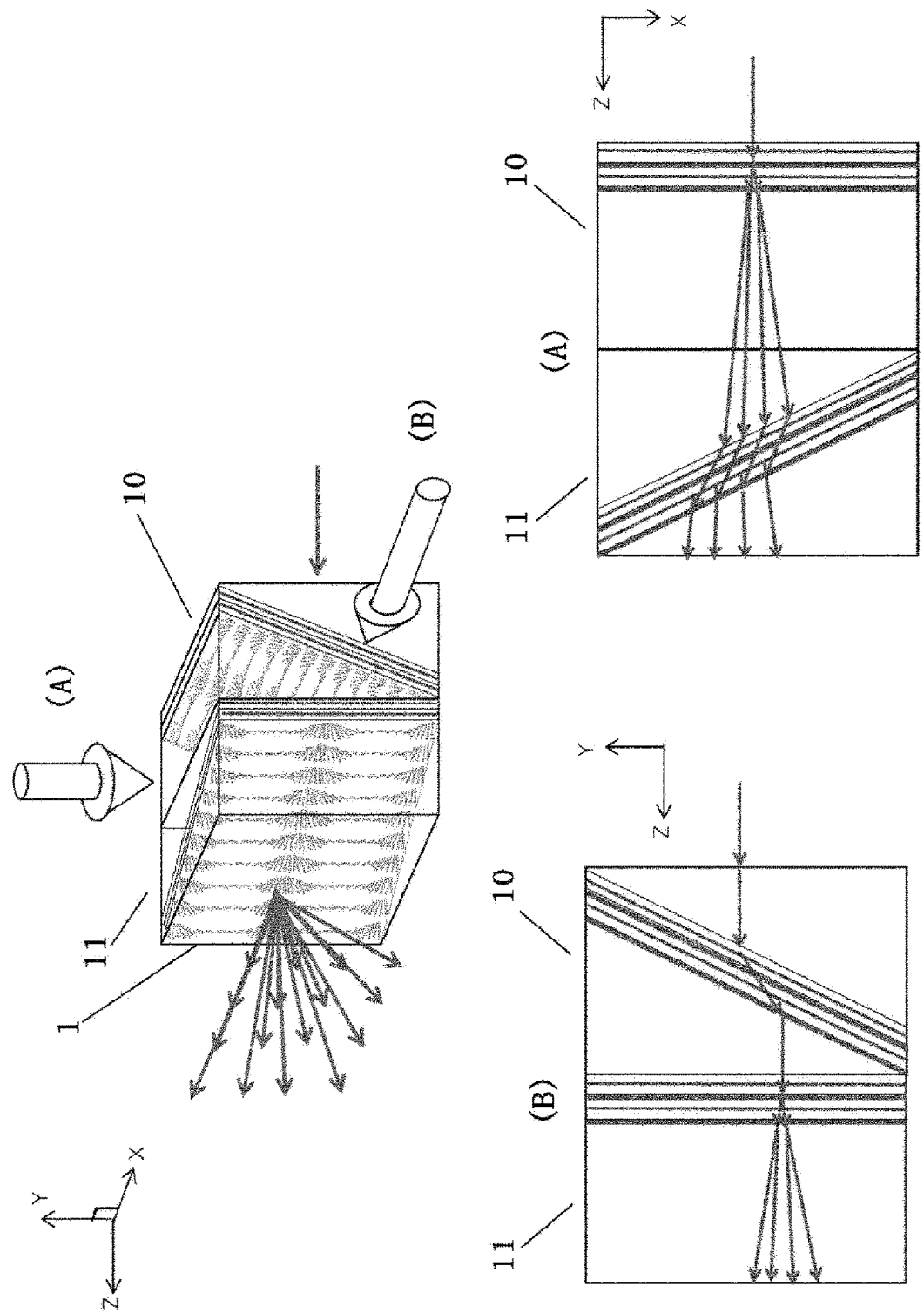
FIG. 10

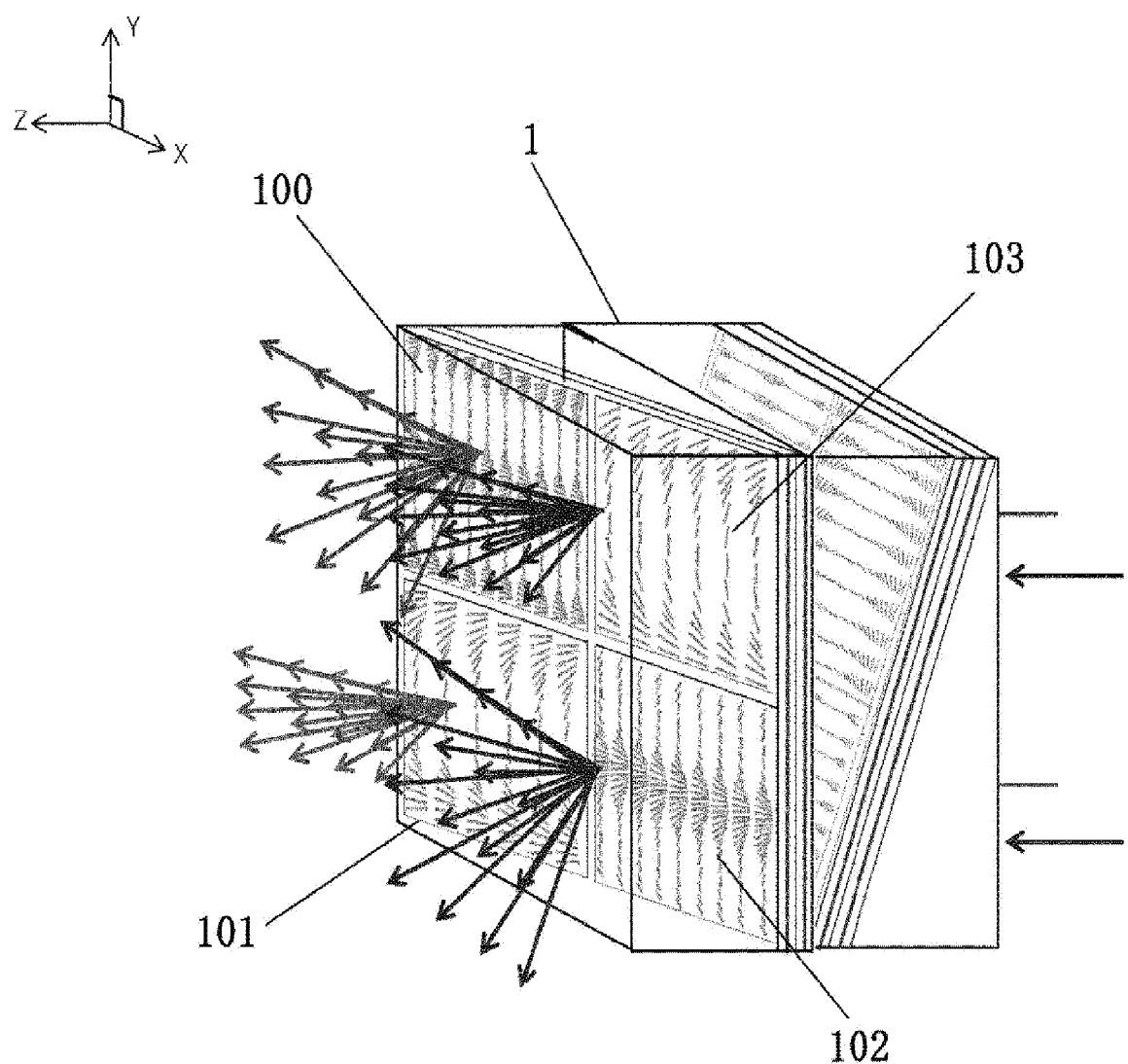
FIG. 11

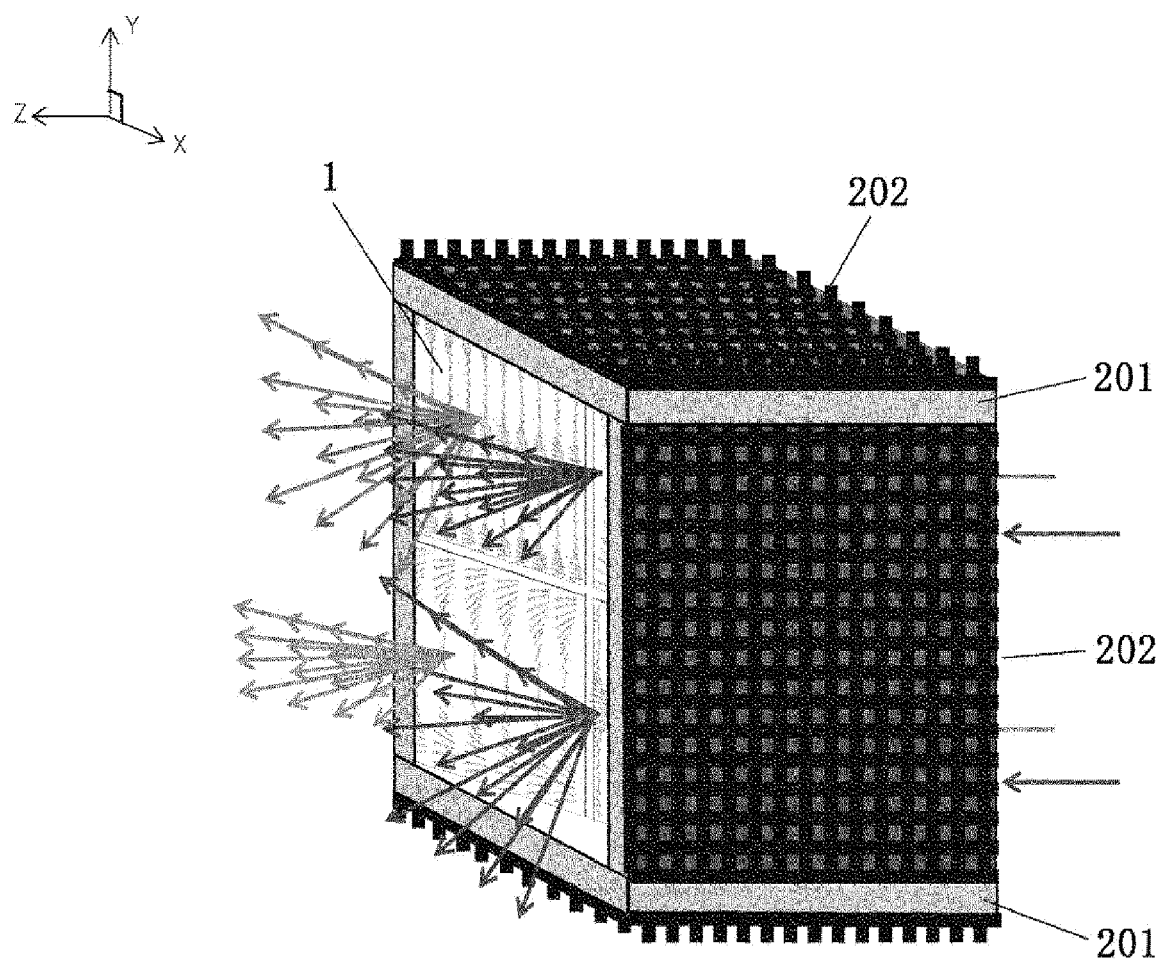
FIG. 12

HIGH-SPEED OPTICAL SWITCHING ENGINE

FIELD OF THE INVENTION

The present invention pertains to a high-speed optical switching engine.

BACKGROUND OF THE INVENTION

FIG. 1 is an example of a conventional liquid crystal phase panel (Non-Patent Literature 1).

Nematic liquid crystal 24 is inserted between two parallel plate electrode panels 23.

In zero-twisted ECB (electrically controlled birefringence), when voltage is not applied to the two parallel plate electrodes, the director (n) of the liquid crystal is aligned parallel with the plate electrodes, and incoming light senses the XZ cross section of index ellipsoids (elliptical index of refraction), and is subjected to retardation. By using a desired thickness of liquid crystal, it is possible to cause the panel to act, for example, as a half-wave plate.

Meanwhile, when voltage is applied to the two parallel plate electrode panels 23, the electric field becomes orthogonal to the plate electrodes, and the director of the liquid crystal also becomes orthogonal in conformance with the electric field. Incoming light senses the XZ cross section of the index ellipsoids (circular index of refraction) and is not subjected to retardation, and the liquid crystal acts as an isotropic medium.

Conventional nematic liquid crystal is widely used in displays, but has a slow switching speed of milliseconds, and cannot be employed in uses that require fast switching speeds. Thus, polymer-stabilized blue phase liquid crystal capable of high-speed switching has been studied.

This liquid crystal takes advantage of the Kerr effect, and is capable of fast switching, but requires that an electric field that is parallel to the plate electrodes be generated. In the case of the parallel plate electrode panels 23 described above, the electric field is constantly orthogonal to the plate electrodes, in which state polymer-stabilized blue phase liquid crystal cannot be used. Thus, comb-shaped electrodes, such as depicted in FIG. 2, that engage in what is referred to as IPS (in-plane switching) have been studied.

In these electrodes, positive and negative or positive and 0 voltages are applied to adjacent comb-shaped electrodes 21 to generate an electric field in the lateral direction (X direction).

However, the electric field distribution is not uniform within the polymer-stabilized blue-phase liquid crystal 22, and a large electric field distribution is produced, with an especially large electric field being generated near the comb-shaped electrodes 21, and electrostriction results in degradation of the switching speed of the polymer-stabilized blue-phase liquid crystal 22.

At long wavelengths, moreover, the required liquid crystal thickness increases, thus necessitating an increasingly larger electric field distribution within the liquid crystal to obtain the desired performance. As a result, the electric field distribution becomes even greater near the comb-shaped electrodes 21, resulting in a phase distribution within the outgoing light beam, and causing various types of degradation in performance, such as loss and crosstalk.

The parallel plate electrode panels 23 yield a more uniform electric field distribution than the comb-shaped electrodes 21. In order to take advantage of this, the incoming light may be made to enter at an oblique angle. An example has been reported in which, in order to create such an arrangement, prism sheets are bonded to the parallel plate electrodes, and the display is driven using a conventional orthogonal electric field to obtain gradient properties from which hysteresis has been removed (Patent Document 1, FIG. 3). However, while this structure is effective in the case of orthogonal incoming light, when the incoming light enters at a large oblique angle, the optically refractive effects of the prism sheets become non-uniform within the light beam, resulting in a large phase distribution within the outgoing light beam.

Meanwhile, an optical switching engine using liquid crystal and polarization gratings has been reported (Patent Document 2, FIG. 4). This engine comprises a phase plate (LC half-wave plate) and a polarization grating (passive PG) bonded together, and assumes that incoming light will enter the two substantially orthogonally.

The reason for having the incoming light be substantially orthogonal is that there will be abrupt degradation of ±1 order diffraction efficiency when the light enters plane (A), as shown in FIG. 8 (simulation-based calculations).

Accordingly, while a phase plate using ordinary nematic liquid crystal (LC half-wave plate) is effective in this conventional structure, an IPS (in-plane switching) phase plate or a structure using a prism sheet must be adopted when using polymer-stabilized blue-phase liquid crystal, and both cases lead to massive degradation in properties such as switching speed and light beam phase distribution, as discussed above.

PRIOR ART LITERATURE

Patent Literature

Patent Document 1: Japanese Laid-Open Patent Publication No. 2014-186045 A
Patent Document 2. US Application Publication No 2012/0188467 A1

Non-Patent Literature

Non-Patent Literature 1: "Fundamentals of phase-only liquid crystal on silicon (LCOS) devices", Zichen Zhang et al. (Light: Science & Applications (2014), p. 16)

SUMMARY OF THE INVENTION

The problems discussed above can be summarized as follows.

(1) IPS (in-plane switching) comb-shaped electrodes generate a large electric field distribution within the liquid crystal, with a large electric field being generated near the electrodes, and electrostriction results in degradations in the switching speed of polymer-stabilized blue-phase liquid crystal.

(2) An especially large thickness of liquid crystal is required at long wavelengths, generating a progressively large electric field distribution within the liquid crystal.

(3) The in-plane electric field distribution is also large, resulting in a phase distribution within the outgoing light beam, and causing various types of degradation in performance, such as loss and crosstalk.

(4) In the structure in Patent Document 1, the optically refractive effects of the prism sheets become non-uniform within the light beam when incoming light enters the blue-phase liquid crystal at a large oblique angle, resulting in a large phase distribution within the outgoing light beam.

(5) The structure in Patent Document 2 comprises phase plates (LC Half-Waveplates) and polarization gratings (Passive PGs) bonded together, and assumes that incoming light will enter the structure substantially orthogonally. This is because PG simulations show that there will be abrupt degradation of diffraction efficiency in ±1 dimension when the light enters plane (A), as shown in FIG. 8.

Accordingly, in order to realize this conventional structure, incoming light must also enter the phase plates bonded to the PGs substantially orthogonally, which implicitly assumes that phase plates using ordinary nematic liquid crystal (LC Half-Waveplates) will be used.

When using polymer-stabilized blue-phase liquid crystal, the IPS (in-plane switching) phase plate or polymer-stabilized blue-phase liquid crystal phase plate using a prism sheet described above must be employed, and both cases lead to massive degradation in optical switching engine properties such a switching speed, loss, and crosstalk.

Thus, an object of the present invention is to solve the problems described above and realize an optical switching engine that generates a uniform electric field distribution within polymer-stabilized blue-phase liquid crystal, and does not cause degradation in switching speed or create phase distributions in the outgoing light beam.

In order to solve the problems described above, the present invention is configured as follows pertaining to an optical switching engine that uses polymer-stabilized blue-phase liquid crystal.

(1) Polymer-stabilized blue-phase liquid crystal is inserted between parallel plates on which are formed conventional thin film electrodes (FIGS. 7A-7C), and the polarization grating (PG) shown in FIGS. 6A-6C is bonded thereto to form one set. Furthermore, multiple such sets are stacked, and two silicon wedges having triangular cross sections are disposed on or bonded to the two sides of the stack so as to have rotational symmetry with each other.

(2) The polarization grating (PG) has a chiral structure in which the director rotates in the through-thickness direction as well, as shown in FIG. 6C, and the silicon wedges are disposed or bonded so that a rotational axis A of a direction in which the director rotates on the surface (XY plane) of the polarization grating (PG) and sloped sides B of the silicon wedges are orthogonal to each other (FIGS. 7A and 7B).

(3) Two sets having the structure described above are used, and disposed or bonded rotated 90° with respect to each other (FIG. 10).

A wedge angle θa of the silicon wedges satisfies the conditions of the following formula:

[Numerical formula 1]

$$\theta a < \sin^{-1}(N2/N1) - \theta b \quad (1)$$

In the formula, $\theta b = \sin^{-1}(No \times \sin \theta o/N1)$, No is the ambient index of refraction (for example, of the air), N1 is the index of refraction of silicon, and θo is the angle of incidence.

Specifically, the present invention is capable of providing the following means.

(1) An optical switching engine comprising:
a switching liquid crystal phase panel comprising a single laminate or multiple laminates stacked in the same direction, the single laminate or each of the multiple laminates comprising a parallel plate liquid crystal panel with a polarization grating plate being bonded to a light-emitting surface of the parallel plate liquid crystal panel, wherein the parallel plate liquid crystal panel is formed by opposingly disposing two substrates that are transparent in an optical wavelength region from ultraviolet to a usage wavelength band, with a thin film electrode that is transparent in a desired optical wavelength region being formed on at least one surface of each of the substrates, so that the thin film electrodes form facing parallel electrodes over a desired gap, the substrates having polymer-stabilized blue-phase liquid crystal inserted between the thin film electrodes, and the parallel plate liquid crystal panel being stabilized by photoirradiation, and wherein the polarization grating plate has a thickness such that it acts as a half-wave plate at a usage wavelength and a birefringence axis of a birefringent medium (referred to as a director) that rotates in-plane at a given period Λ; and two wedge-shaped substrates that are formed from a material having a greater index of refraction than the substrates and have right-triangular cross sections;

wherein the switching liquid crystal phase panel is sandwiched between sloped surfaces of the two right-triangular cross-sectioned wedge-shaped substrates so that the axis in which the birefringence axis rotates in-plane is orthogonal to sloped sides of the wedge-shaped substrates; and wherein incoming light entering an end surface (on the opposite side of the switching liquid crystal phase panel from the polarization grating plate; referred to as the light-receiving surface) of one of the wedge-shaped substrates is emittable with a desired polarization from an end surface of the other wedge-shaped substrate (referred to as the light-emitting surface) that is parallel to the end surface.

This is the basic configuration of the present invention, and is an embodiment of the optical switching engine described in Example 1 below.

(2) The optical switching engine according to (1), wherein the polarization grating plate has a chiral structure in which the birefringence axis of the director also rotates in the through-thickness direction.

(3) The optical switching engine according to (1), wherein, when light enters the end surface of the one wedge-shaped substrate, the engine acts as a substantially isotropic medium when voltage is not applied to the facing thin film electrodes, and as the half-wave plate at the usage wavelength when voltage is applied thereto.

(4) The optical switching engine according to (1) or (2), wherein the substrates are glass primarily composed of $SiO_2$ or Si substrates.

(5) The optical switching engine according to any one of (1) through (4), wherein the wedge-shaped substrates are constituted by silicon.

(6) The optical switching engine according to any one of (1) through (5), wherein a non-reflective coat is formed on the sloped surfaces of the wedge-shaped substrates and the light-receiving surface or the light-emitting surface so as to be non-reflective with respect to the index of refraction of the adjacent material.

This a modified embodiment of the basic configuration and Example 1 of the present invention.

(7) A duplexed optical switching engine using two stages of the optical switching engine according to any one of (1) through (6), characterized in that the two stages of the optical switching engine are bonded in such a way that the light-emitting surface of the optical switching engine in the leading stage and the light-receiving surface of the optical switching engine in the following stage are each rotated 90°.

This is an expanded configuration for the present invention, and is an embodiment of the optical switching engine described in Example 2 below.

(8) A multisegmented optical switching engine comprising the optical switching engine according to (7), wherein the parallel plate liquid crystal panels of the switching liquid crystal phase panels are divided into two or more segments and polarization grating plates constituted by segments each having the period A being different are provided on the segments, and wherein incoming lights entering the segments are independently polarized by the polarization grating plates and emitted.

This is an expanded configuration for the present invention, and is an embodiment of the optical switching engine described in Example 3 below.

(9) The optical switching engine according to (7) or (8), wherein the periphery thereof is controlled using a Peltier element so as to have a desired temperature.

This is an expanded configuration for the present invention, and is an embodiment of the optical switching engine described in Example 4 below.

The present invention has the following effects.

(1) It is possible to realize a high-speed 1×N optical switching engine in which a uniform electric field distribution is generated within polymer-stabilized blue-phase liquid crystal, and the light beam is polarized in-plane without degradation in switching speed or degradation in the phase distribution of the emitted light beam, which was difficult to do in the prior art.

(2) It is possible to realize a high-speed 1×N steering device, which was difficult to do in the prior art.

BRIEF DESCRIPTION OF THE DRAWINGS

FIG. 1 is an example of a conventional nematic liquid crystal phase panel.

FIG. 2 is an illustration of comb-shaped electrodes for performing what is known as IPS (in-plane switching) of polymer-stabilized blue-phase liquid crystal according to the prior art.

FIG. 3 is an illustration of the structure in Patent Document 1, in which prism sheets are used on the input and output sides in order to cause light to enter the blue-phase liquid crystal at a large oblique angle.

FIG. 4 is an example of light beam steering using the structure in Patent Document 2, in which phase plates (LC Half-Waveplates) and polarization gratings (Passive PGs) are bonded together.

FIGS. 5A-5B illustrate polymer-stabilized blue-phase liquid crystal parallel electrodes according to the prior art. FIG. 5A depicts index ellipsoids showing the isotropic properties of the polymer-stabilized blue-phase liquid crystal when voltage is not being applied thereto, and FIG. 5B depicts index ellipsoids of the polymer-stabilized blue-phase liquid crystal when voltage is applied thereto.

FIGS. 6A-6C illustrate a polarization grating (PG) used in the present invention. FIG. 6A depicts left-circularly polarized light orthogonally entering the center and being emitted from the opposite side as right-circularly polarized light at a different angle θ in one direction in the X axis, and FIG. 6B depicts right-circularly polarized light orthogonally entering the center and being emitted from the opposite side as left-circularly polarized light at a different angle θ in the opposite direction in the X axis FIG. 6C depicts a chiral structure in the Z-axis direction.

FIGS. 7A-7C illustrate an example of a 1×2 optical switching engine comprising the basic structure of the present invention, using a polymer-stabilized blue-phase liquid crystal panel and a polarization grating, with these being bonded to two silicon wedges so as to have point symmetry with each other.

FIG. 8 is a calculatory diagram showing the efficiency of ±1 order diffracted light with respect to the light-receiving surface of the polarization grating (PG).

FIG. 9 is an example of the present invention.

FIG. 10 is another example of the present invention.

FIG. 11 is another example of the present invention.

FIG. 12 is an example of a module in which the high-speed optical switching engine of the present invention is temperature controlled.

DETAILED DESCRIPTION OF THE INVENTION

Some examples of the present invention will be presented below.

Example 1

FIGS. 7A-7C depict an example of a 1×N optical switching engine according to the present invention.

Before describing the present example, the polymer-stabilized blue-phase liquid crystal that is one element making up the present invention will first be described. The basic operation of the polarization grating (PG) will then be described, and, finally, examples of the 1×N optical switching engine will be described.

Blue-phase liquid crystal is a frustrated system in which local stability effected by double twisting of the liquid crystal supersedes global stability effected by connecting space without defects, and, in general, is present in an extremely narrow temperature range of about 1° C. Polymer is added thereto to fill in the defects in the space, thermally stabilize the liquid crystal, and expand the operating range to a few dozen ° C.

As shown in FIG. 5A, polymer-stabilized blue-phase liquid crystal becomes circular index ellipsoids and acts as an optically isotropic medium when an electric field is not applied thereto. Meanwhile, as shown in FIG. 5B, birefringence is generated at substantially the square and the crystal becomes elliptical index ellipsoids when an electric field is applied thereto.

When light enters along the longitudinal axis direction (Y axis) of the index ellipsoids in the state shown in FIG. 5A, two orthogonal beams of polarized light (orthogonal to the vector along which the light is traveling) sense the index of refraction of the circles (sections orthogonal to the longitudinal axis of the index ellipsoids); thus, retardation does not occur, and the light must enter obliquely as shown in FIG. 5B.

In the state shown in FIG. 5B, the sections of the index ellipsoids have elliptical shapes, the two beams of polarized light sense different indexes of refraction; thus, retardation occurs.

FIGS. 6A-6C show the operation of the polarization grating (PG).

The polarization grating (PG) is formed from a birefringent material such as liquid crystal polymer, and a director 12 constituting a birefringent medium is rotated along a given rotational axis A (17) at a given period A (16). The grating is designed to have a thickness such that a half-wave plate is yielded at the usage wavelength, and is equivalent to an infinitesimal half-wave plate being rotated along the rotational axis A (17).

In this structure, the direction of polarization (diffraction) of the incoming circularly polarized light changes according to the direction of rotation (right, left) thereof.

For example, left-circularly polarized light is diffracted to the right to become right-circularly polarized light. Conversely, right-circularly polarized light is diffracted to the left to become left-circularly polarized light. The angle of diffraction θ thereof is determined according to the following formula.

[Numerical formula 2]

$$\sin\theta = \pm\lambda/\Lambda + \sin\theta o \quad (2)$$

In the formula, λ is wavelength, Λ is the rotational period of the director, and θo is the angle of incidence. Accordingly, the angle of diffraction increases as period Λ decreases.

FIGS. 7A-7C depict a 1×2 optical switching engine 1 constituting the basic configuration of the optical switching engine of the present invention. FIG. 7A is a perspective view, FIG. 7B is an exploded view, and FIG. 7C is an enlarged view of a polymer-stabilized blue-phase liquid crystal panel when voltage is being applied thereto.

The optical switching engine 1 of the present invention comprises a polymer-stabilized blue-phase liquid crystal panel 2, a polarization grating 3, and two silicon wedges 8 having triangular cross sections.

The polymer-stabilized blue-phase liquid crystal panel 2 has a parallel plate electrode structure, wherein polymer-stabilized blue-phase liquid crystal 6 is inserted between two substrates 5 on one surface of each of which is formed a thin film electrode 4, and stabilized via photoirradiation. The polarization grating 3 is disposed on or bonded to the polymer-stabilized blue-phase liquid crystal panel 2 (the whole thus formed being referred to as 1×2 element 9).

The 1×2 element 9 is sandwiched between the two silicon wedges 8 having triangular cross sections to form the 1×2 optical switching engine 1.

It is vital here that the polarization grating 3 have a chiral structure wherein the director also rotates in the through-thickness direction (at a considerably smaller order of a few μm compared to the rotational period A in the XY plane), as shown in FIG. 6C, and that the polarization grating 3 is disposed or bonded so that the rotational axis A (17) of the director of the polarization grating 3 is orthogonal to the sloped sides B of the silicon wedges 8. The reason for this will be discussed hereinafter.

The two silicon wedges 8 are bonded so as to be rotationally symmetrical around the 1×2 element 9.

A non-reflective coat is applied to the surfaces of the sloped sides of the silicon wedges 8 so as to yield non-reflective conditions with respect to the substrates 5 forming part of the polymer-stabilized blue-phase liquid crystal panel 2.

The substrates 5, thin film electrodes 4, and polymer-stabilized blue-phase liquid crystal 6 that constitute the polymer-stabilized blue-phase panel 2 are formed in such a way that they have substantially identical indexes of refraction.

When light enters from the right at an orthogonal angle (θb in formula (1)=0) as shown in FIG. 7A, the light refracts according to Snell's law, as shown in formula (3) below, at the boundaries between the silicon wedges 8 and the polymer-stabilized blue-phase liquid crystal panel 2, and the light is propagated obliquely at an angle of θ' with respect to the layer of polymer-stabilized blue-phase liquid crystal 6.

Consequently, a light beam entering at an orthogonal angle from the right is propagated obliquely (at angle θ') through the polymer-stabilized blue-phase liquid crystal 6, and thus senses birefringence and undergoes retardation.

This effect becomes more pronounced as N1 increases with respect to N2 and as θa increases in formula (3), causing the light beam to be propagated at a large angle θ'.

It is thus vital to use a material (in this case, silicon) that has a large index of refraction N1 for inputs.

The reasons for this will be discussed in detail below. Consider a case in which the substrates 5 forming part of the polymer-stabilized blue-phase panel 2 are glass (index of refraction N2=1.5), the silicon wedges 8 are silicon (index of refraction N1=3.5), and the wedge angle θa is 20°.

When light enters orthogonally from the right as shown in FIG. 7A, θ'=53° as per formula (2). If there were no silicon wedges 8, and light entered the polymer-stabilized blue-phase liquid crystal panel 2 directly from the air, it would be impossible to realize this angle of 53°, about 40° at most would be the limit (and that would still be difficult in practice).

The reason for this is that, when the periphery is constituted by air, light propagated through the polymer-stabilized blue-phase panel 2 at θ'=53° is totally reflected at the boundary, making external excitation impossible (theoretically, excitation by evanescent waves would be necessary). Thus, Patent Document 2 assumes that incoming light will enter substantially orthogonally.

It is thus extremely vital to use a material (in this case, silicon) that has a large index of refraction N1 for inputs. Because silicon has little absorption from 1.2 μm to 6 μm, it can be used as the material of the wedges in the present invention in this wavelength region.

At wavelengths shorter than 1.2 μm, high-refractive-index glass (such as S-LAH79 (index of refraction 2.00) manufactured by Ohara, or TAFD40 (index of refraction 2.00) manufactured by HOYA) or high-refractive-index resin can be used. Alternatively, conventional glass may also be used, although this will increase dimensions.

The wedge angle θa must satisfy formula (4). The reason for this is that total reflectance occurs at the boundaries between the silicon wedges 8 and the polymer-stabilized blue-phase liquid crystal panel 2, and light will not be outputted from the left surface. Formula (4) is a special case of formula (1) in which θb=0.

In this case, the conditions with respect to the angle θa of the silicon wedges 8 must satisfy formula (3).

[Numerical formula 3]

$$N1 \times \sin\theta a = N2 \times \sin\theta' \quad (3)$$

[Numerical formula 4]

$$\theta a < \sin^{-1}(N2/N1) \quad (4)$$

In the formulas, θa is the wedge angle of the silicon wedges 8, N1 is the index of refraction of silicon, and N2 is the index of refraction of the substrates 5.

The formulas assume that the thin film electrodes 4, substrates 5, and polymer-stabilized blue-phase liquid crystal 6 that constitute the polymer-stabilized blue-phase liquid crystal panel 2 have substantially identical indexes of refraction.

A light beam entering from the right at an orthogonal angle in this way is propagated obliquely (at angle θ') through the polymer-stabilized blue-phase liquid crystal 6 and senses birefringence; thus, half-wave plate functioning (retardation=π) can be obtained by using a suitable thickness (T) of polymer-stabilized blue-phase liquid crystal 6.

Consequently, the polymer-stabilized blue-phase liquid crystal 6 acts as an isotropic (retardation=0) medium when voltage is not applied to the polymer-stabilized blue-phase liquid crystal panel 2 because the index ellipsoids of the polymer-stabilized blue-phase liquid crystal 6 are spheres, and as a half-wave plate (retardation=π) when voltage is applied.

Now a case in which a right-circularly polarized light beam enters from the right will be considered. When voltage is not being applied (off) to the polymer-stabilized blue-phase liquid crystal panel 2, the liquid crystal acts as an isotropic (retardation=0) medium, thus, the polarized light maintains its polarized state and is outputted as right-circularly polarized light.

Meanwhile, when voltage is being applied (on), the liquid crystal acts as a half-wave plate (retardation=π); thus, left-circularly polarized light is outputted.

In the present invention, the polarization grating 3 is disposed or bonded after the parallel plate polymer-stabilized blue-phase liquid crystal panel 2. Thus, the light beam is polarized (diffracted) in the X-Z plane (horizontal plane) according to whether the incoming circularly polarized light is right-circular or left-circular.

It is vital here that the polarization grating 3 be disposed or bonded so that the rotational axis A (17) of the director of the polarization grating 3 is orthogonal to the sloped sides B of the silicon wedges 8.

FIG. 8 shows the efficiency of the polarization grating 3 with respect to two planes of incidence (A and B).

In (A) efficiency is greatly degraded when the angle of incidence θ changes, whereas there is substantially no degradation in efficiency in (B).

(B) is equivalent to case in which the polarization grating 3 is disposed or bonded so that the rotational axis A of the director of the polarization grating 3 is orthogonal to the sloped sides B of the silicon wedges 8, with no degradation in properties even when light enters at a large angle θ'. The director of the polarization grating 3 has a chiral structure as shown in FIG. 6C.

FIGS. 7A-7C depict an arrangement comprising one 1×2 element 9 (referred to as a switching liquid crystal phase panel) set comprising a polymer-stabilized blue-phase liquid crystal panel 2 and a polarization grating 3. This arrangement acts as a 1×2 optical switching engine 1 that switches in the X-Z plane (horizontal plane).

FIG. 9 depicts an arrangement using two 1×2 element 9 sets, which acts as a 1×4 optical switching engine 1 that switches in the X-Z plane (horizontal plane). In the present example, the period Λ of the polarization grating 3 of the second set is Λ/2.

A 1×2N optical switching engine that operates in the X-Z plane (horizontal plane) can be realized by disposing N sets of 1×2 elements 9 in multiples stages in this way.

Example 2

FIG. 10 is another example of the present invention. A 1×4 optical switching engine 11 that switches in the Y-Z plane (orthogonal plane) is disposed or bonded after a 1×4 optical switching engine 10 that switches in the X-Z plane (horizontal plane). As a result, it is possible to realize a two-dimensional 1×16 optical switching engine that operates in the X-Y plane.

In this case, an optical switching engine having a low maximum angle of polarization can be disposed in front to combine an M switching engine and an N switching engine and realize a desired M×N optical switching engine that exhibits little walk-off.

Example 3

FIG. 11 is another example of the present invention.

Four optical switching engines A-D (100, 101, 102, 103) having different angles of polarization and switching numbers are formed in one optical switching engine 1. This can easily be realized by dividing the electrodes of the polymer-stabilized blue-phase liquid crystal panel 2 or locally altering the pattern of the polarization grating.

As a result, a compact multi-beam optical switching engine capable of independently switching multiple beams can be realized.

Example 4

FIG. 12 is another example of the present invention.

The periphery of the optical switching engine 1 is covered by Peltier elements 201, and heat sinks 202 are disposed on the outsides thereof to control temperature. As a result, it is possible to manifest stable switching even when the ambient temperature changes.

The 1×N switch according to the present invention can also be applied to optical steering devices.

1 Optical switching engine
2 Polymer-stabilized blue-phase liquid crystal panel (parallel plate liquid crystal panel)
3 Polarization grating (PG)
4 Thin film electrode
5 Substrate
6 Polymer-stabilized blue-phase liquid crystal
7 Director
8 Silicon wedge
9 1×2 element, switching liquid crystal phase panel
10 1×4 optical switching engine that switches in the Y-Z plane (orthogonal plane)
11 1×4 optical switching engine that switches in the X-Z plane (horizontal plane)
12 Director
13 Light
14 Left-circularly polarized light
15 Right-circularly polarized light
16 Period Λ
17 Rotational axis A
21 Comb-shaped electrode
22 Polymer-stabilized blue-phase liquid crystal
23 Parallel plate electrode panel
24 Nematic liquid crystal
100 Optical switching engine A
101 Optical switching engine B
102 Optical switching engine C
103 Optical switching engine D
201 Peltier element
202 Heat sink

What is claimed is:

1. An optical switching engine for switching light beam from a light source comprising:

a switching liquid crystal phase panel comprising a single laminate or multiple laminates stacked in the same direction, the single laminate or each of the multiple laminates comprising a parallel plate liquid crystal panel with a polarization grating plate being bonded to a light-emitting surface of the parallel plate liquid crystal panel, wherein the parallel plate liquid crystal panel is formed by opposingly disposing two substrates that are transparent in an optical wavelength region including ultraviolet, with a thin film electrode that is transparent in an optical wavelength region being formed on at least one surface of each of the substrates, so that the thin film electrodes form facing parallel electrodes with a gap, the substrates having polymer-stabilized blue-phase liquid crystal inserted between the thin film electrodes, and the parallel plate liquid crystal panel being stabilized by photoirradiation, and wherein the polarization grating plate has a thickness such that it acts as a half-wave plate in the optical wavelength region including ultraviolet and a birefringence axis of a birefringent medium that rotates in-plane at a given period $\Lambda$; and two wedge-shaped substrates that are formed from a material having a greater index of refraction than the substrates and have right-triangular cross sections;

wherein the switching liquid crystal phase panel is sandwiched between sloped surfaces of the two right-triangular cross-sectioned wedge-shaped substrates so that the axis in which the birefringence axis rotates in-plane is orthogonal to sloped sides of the wedge-shaped substrates; and wherein incoming light entering a light-receiving surface that is an end surface of one of the wedge-shaped substrates on the opposite side of the switching liquid crystal phase panel from the polarization grating plate is emittable with a polarization from a light-emitting surface that is an end surface of the other wedge-shaped substrate parallel to the end surface.

2. The optical switching engine according to claim 1, wherein the polarization grating plate has a chiral structure in which the birefringence axis of the birefringent medium also rotates in the through-thickness direction.

3. The optical switching engine according to claim 1, wherein, when light enters the end surface of the one wedge-shaped substrate, the engine acts as an isotropic medium in a state where light enters the end surface of the one wedge-shaped substrate and voltage is not applied to the facing thin film electrodes, and as the half-wave plate in the optical wavelength region in a state where voltage is applied thereto.

4. The optical switching engine according to claim 1 or 2, wherein the substrates are glass primarily composed of $SiO_2$ or Si substrates.

5. The optical switching engine according to claim 4, wherein the wedge-shaped substrates are constituted by silicon.

6. The optical switching engine according to claim 4, wherein a non-reflective coat is formed on the sloped surfaces of the wedge-shaped substrates, and the light-receiving surface or the light-emitting surface so as to be non-reflective with respect to the index of refraction of the adjacent material.

7. The optical switching engine according to any one of claims 1-3, wherein the wedge-shaped substrates are constituted by silicon.

8. The optical switching engine according to claim 7, wherein a non-reflective coat is formed on the sloped surfaces of the wedge-shaped substrates, and the light-receiving surface or the light-emitting surface so as to be non-reflective with respect to the index of refraction of the adjacent material.

9. The optical switching engine according to any one of claims 1-3, wherein a non-reflective coat is formed on the sloped surfaces of the wedge-shaped substrates, and the light-receiving surface or the light-emitting surface so as to be non-reflective with respect to the index of refraction of the adjacent material.

10. The optical switching engine according to claim 9, wherein a non-reflective coat is formed on the sloped surfaces of the wedge-shaped substrates, and the light-receiving surface or the light-emitting surface so as to be non-reflective with respect to the index of refraction of the adjacent material.

11. A duplexed optical switching engine using two stages of the optical switching engine according to any one of claim 1, characterized in that the two stages of the optical switching engine are bonded in such a way that the light-emitting surface of the optical switching engine in the leading stage and the light-receiving surface of the optical switching engine in the following stage are each rotated 90°.

12. A multisegmented optical switching engine comprising the duplexed optical switching engine according to claim 11, wherein the parallel plate liquid crystal panels of the switching liquid crystal phase panels are divided into two or more segments and polarization grating plates constituted by segments each having the period $\Lambda$ being different are provided on the segments, and wherein incoming lights entering the segments are independently polarized by the polarization grating plates and emitted.

13. The duplexed optical switching engine according to claim 11, wherein the duplexed optical switching engine comprises a Peltier element configured to controll a temperature of the periphery thereof.

14. The multisegmented optical switching engine according to claim 12, wherein the multisegmented optical switching engine comprises a Peltier element configured to controll a temperature of the periphery thereof.

* * * * *